Feb. 18, 1930. H. T. BACKHUS 1,748,041
AUXILIARY CONTROL FOR MOTOR VEHICLES
Filed Jan. 30, 1928 10 Sheets-Sheet 1
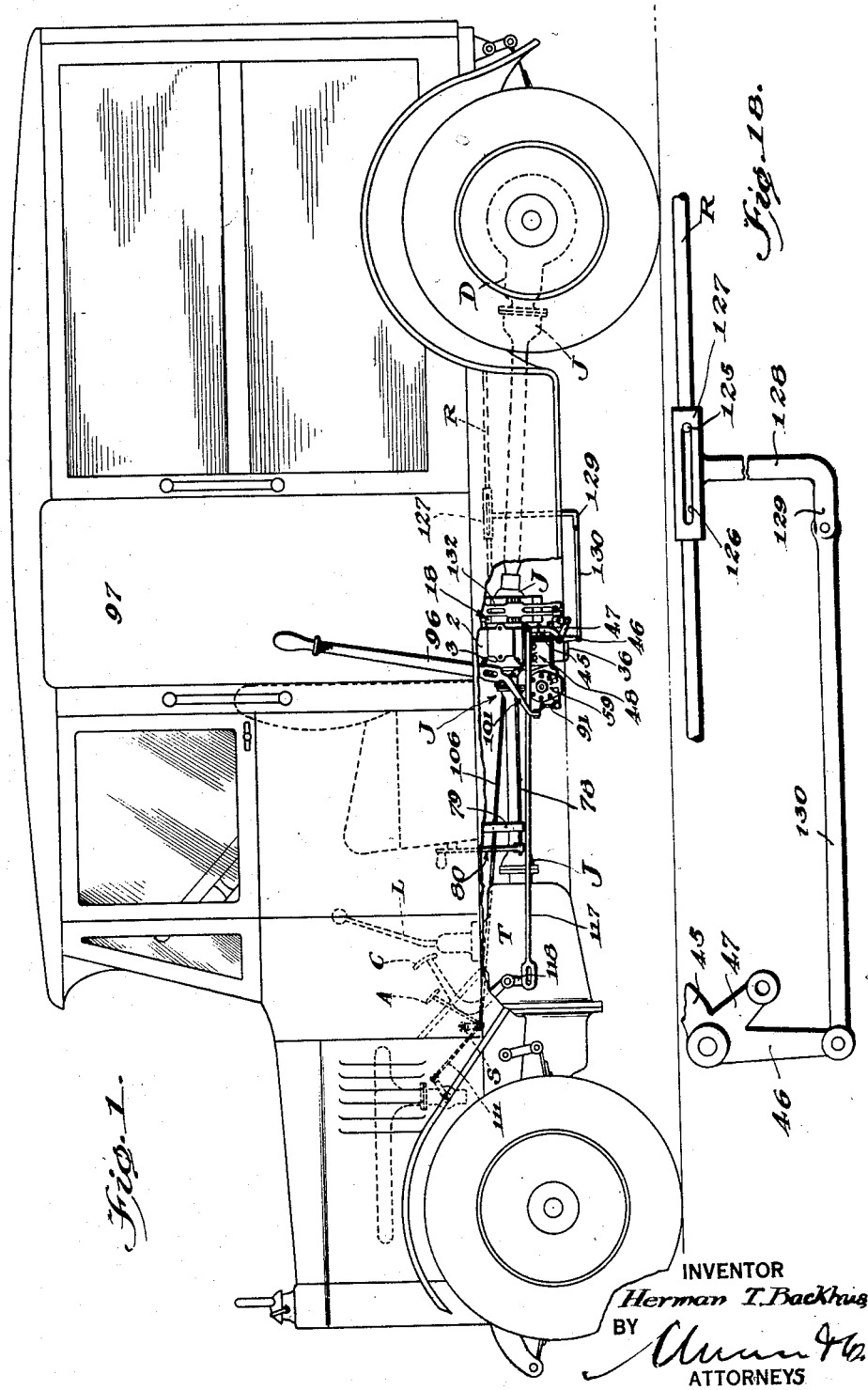
INVENTOR
Herman T. Backhus
BY
ATTORNEYS

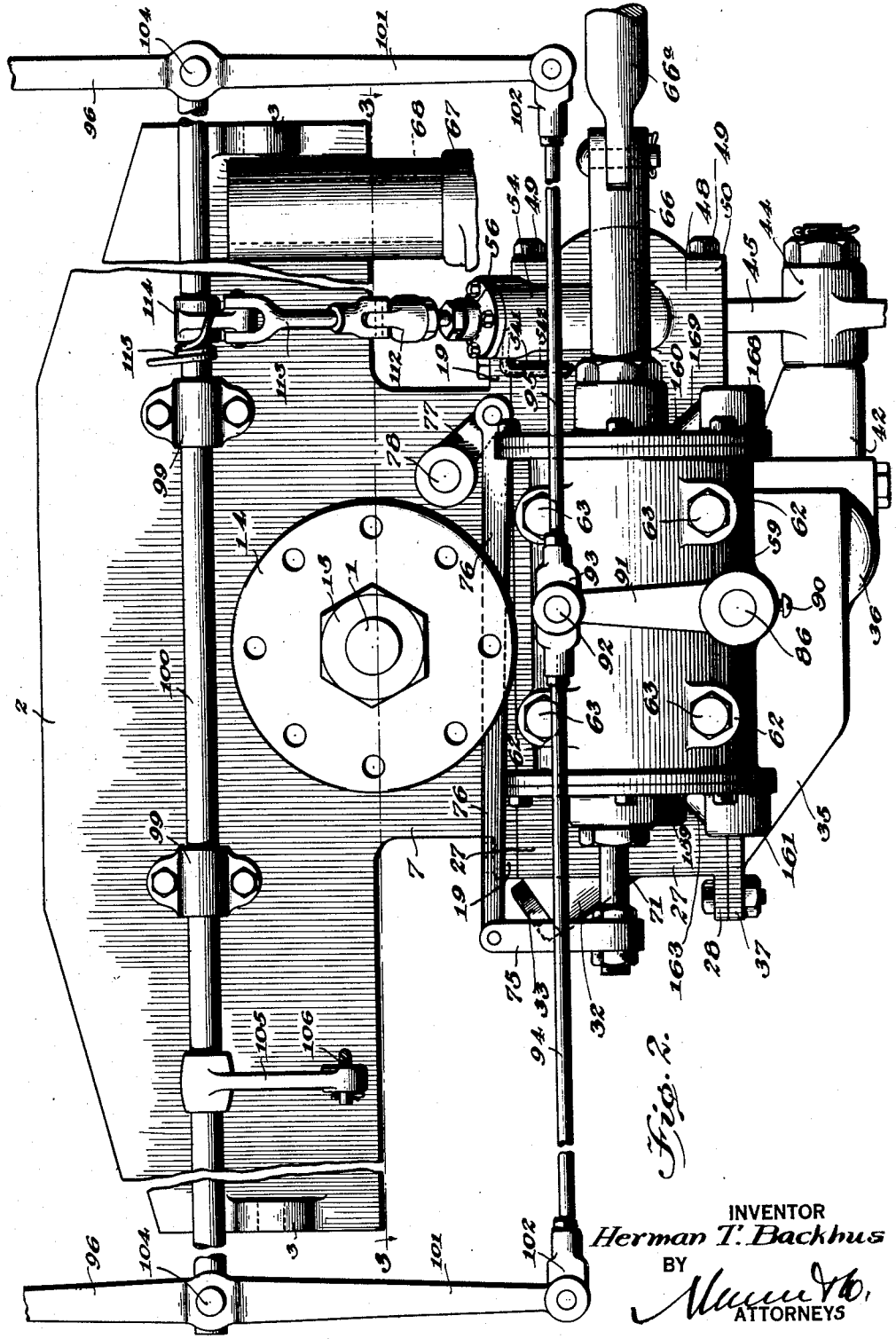

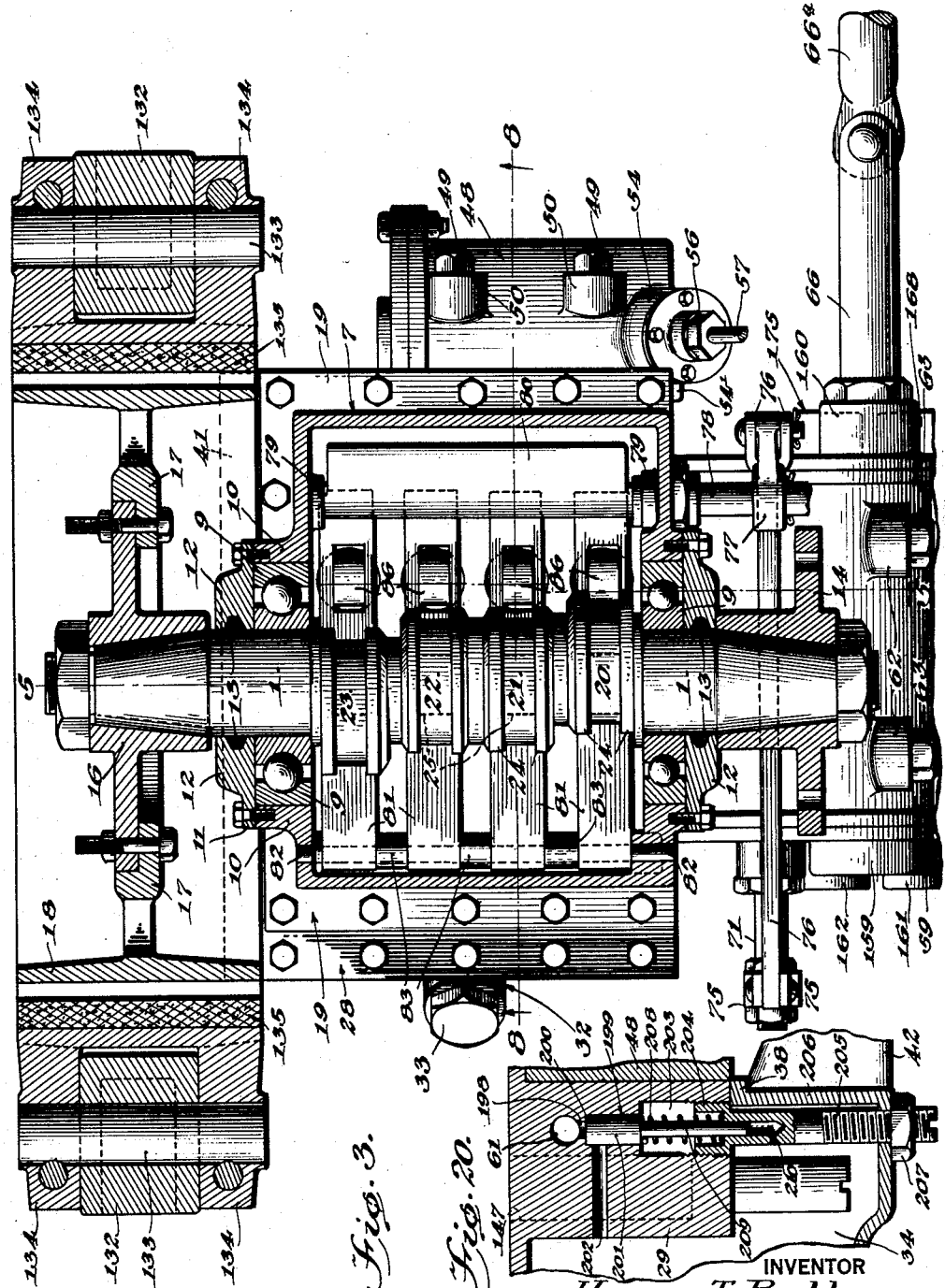

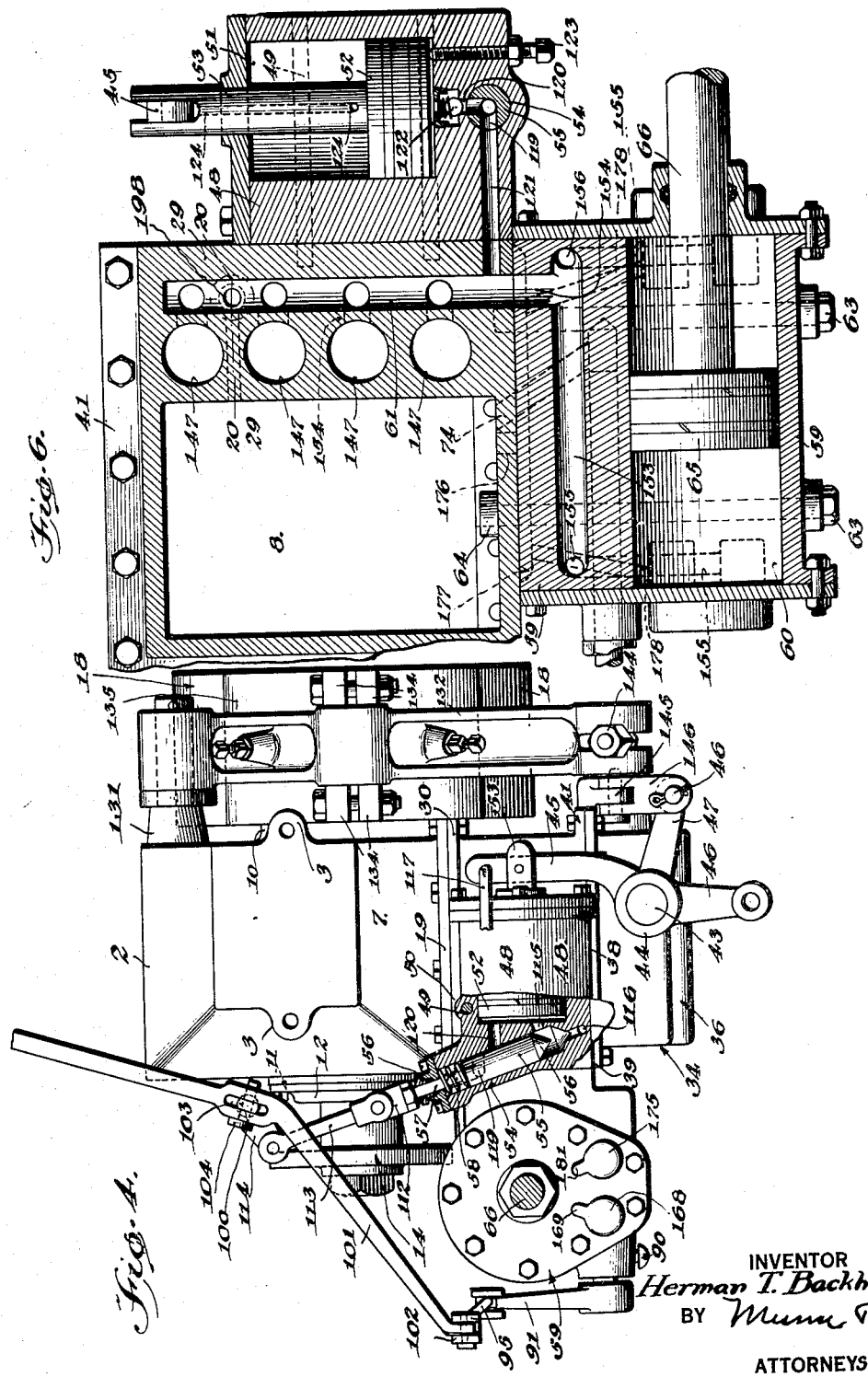

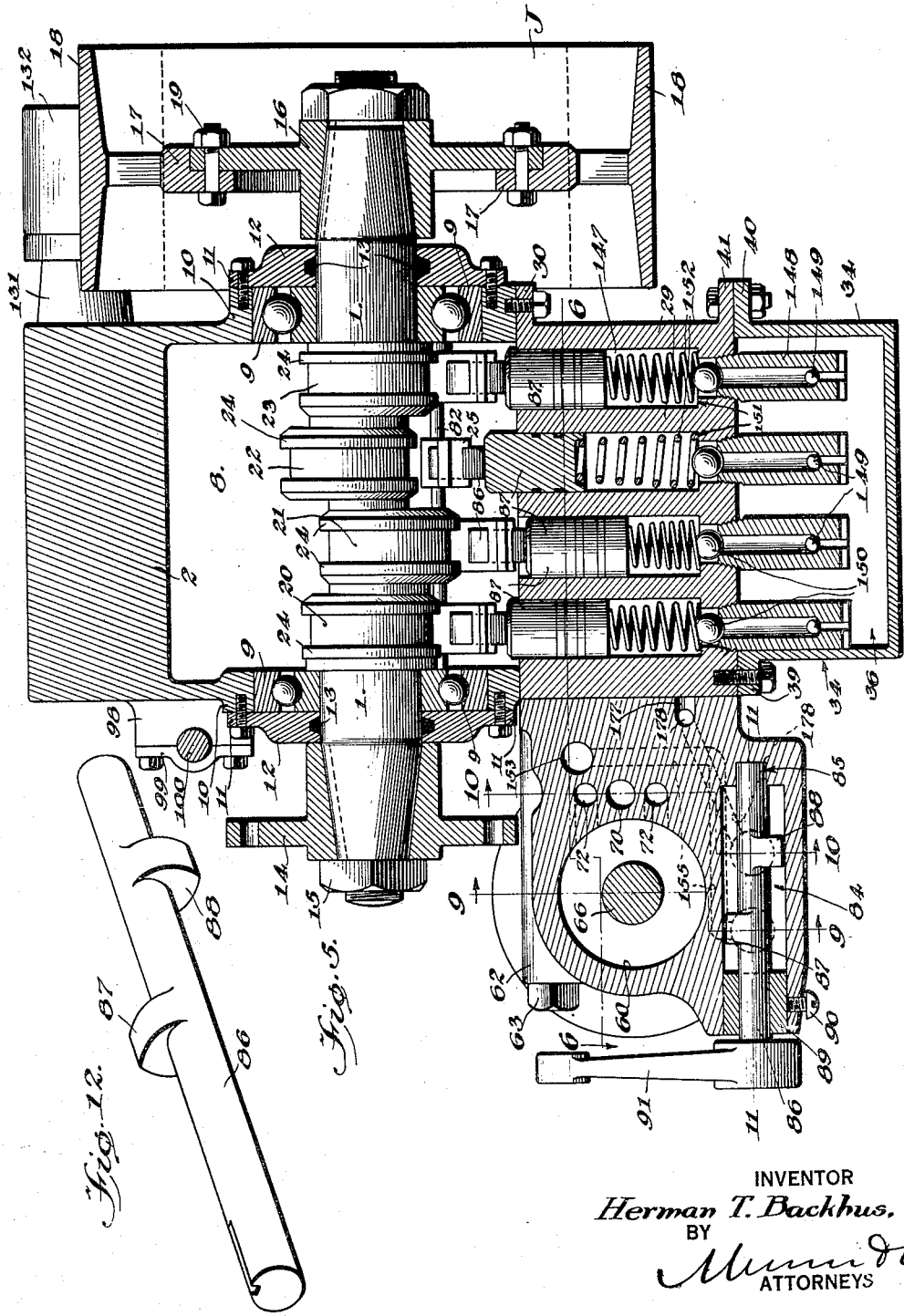

Feb. 18, 1930. H. T. BACKHUS 1,748,041
AUXILIARY CONTROL FOR MOTOR VEHICLES
Filed Jan. 30, 1928 10 Sheets-Sheet 6
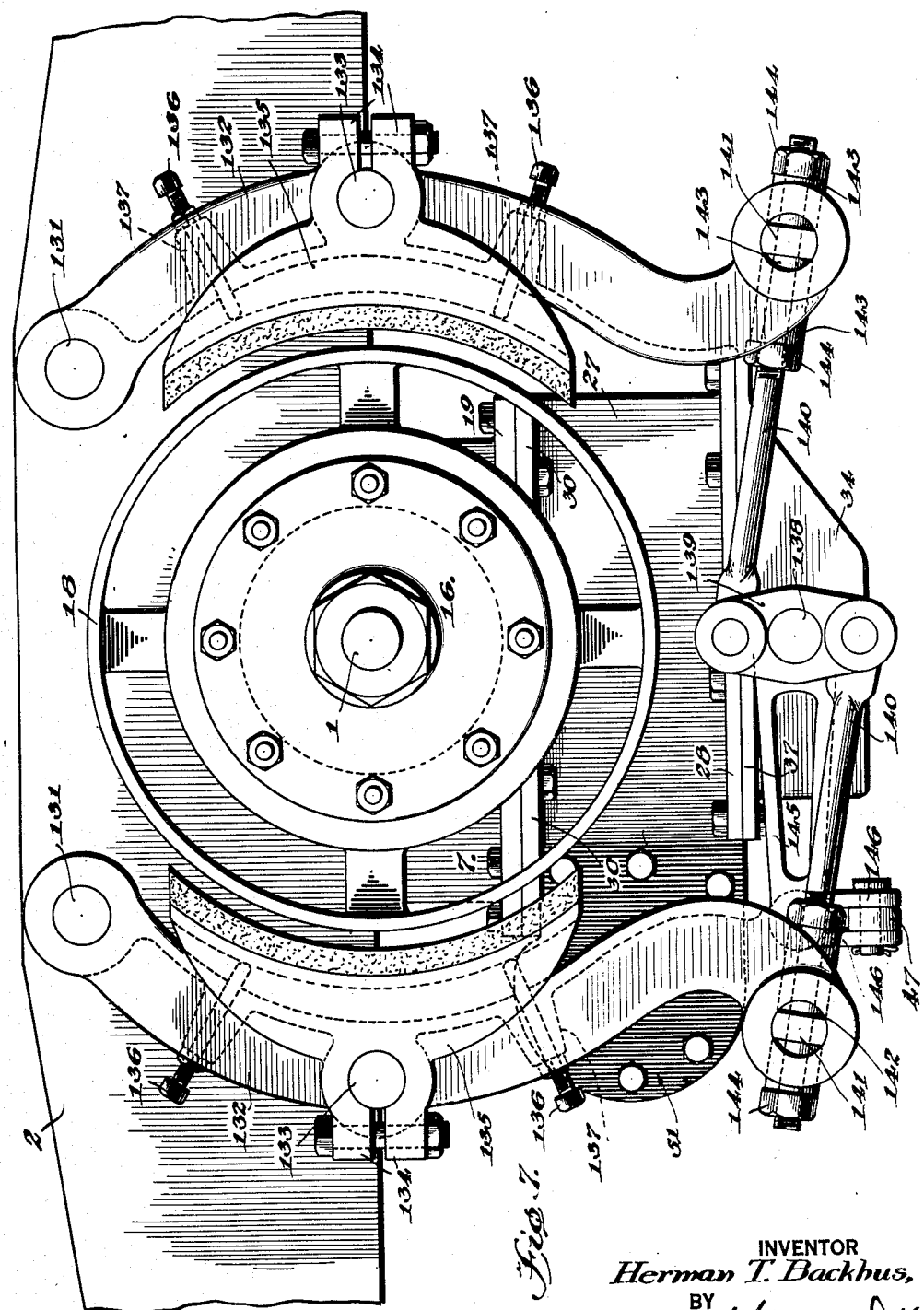
INVENTOR
*Herman T. Backhus,*
BY
*Munn & Co.*
ATTORNEYS

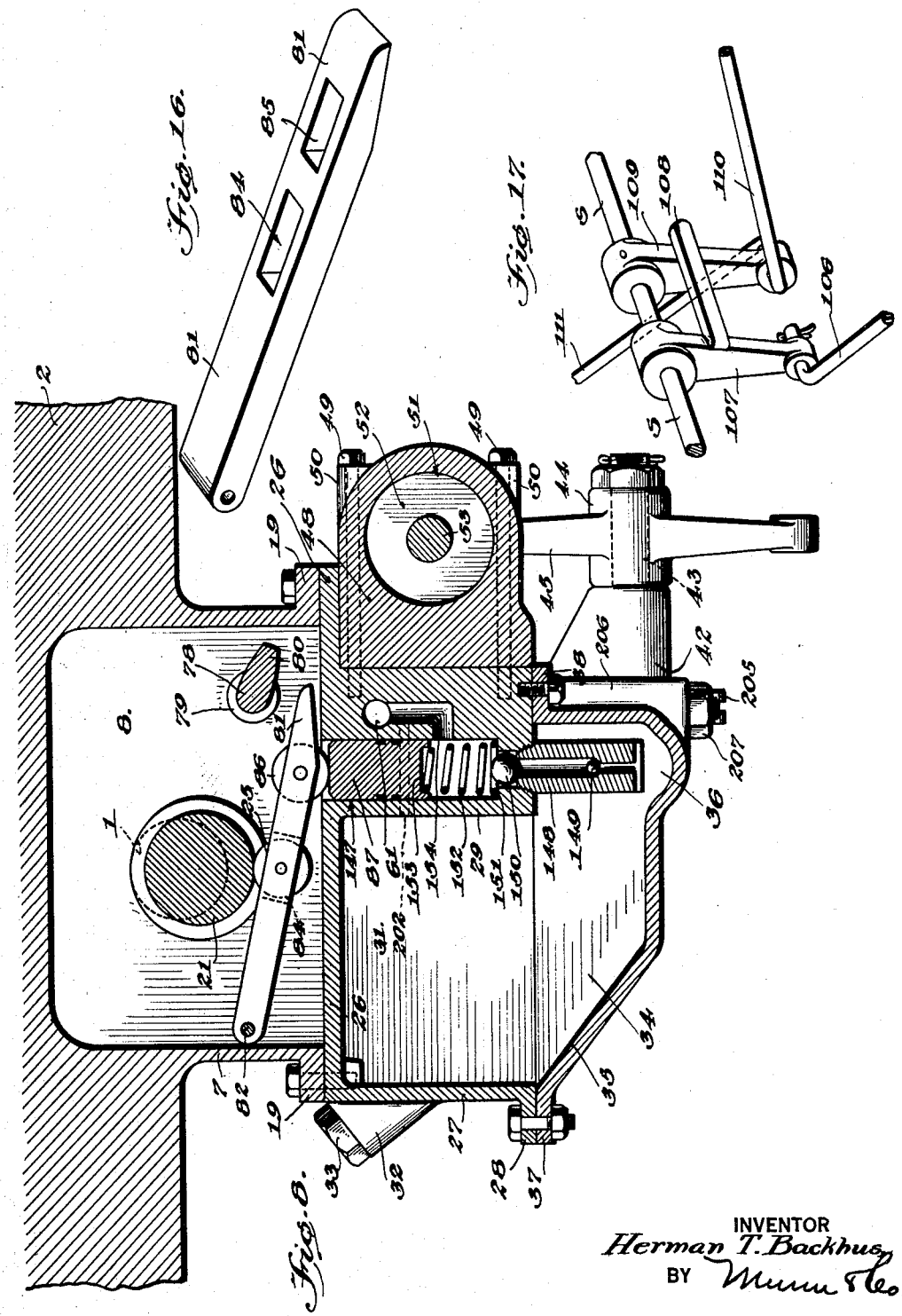

Feb. 18, 1930.  H. T. BACKHUS  1,748,041
AUXILIARY CONTROL FOR MOTOR VEHICLES
Filed Jan. 30, 1928    10 Sheets-Sheet 8
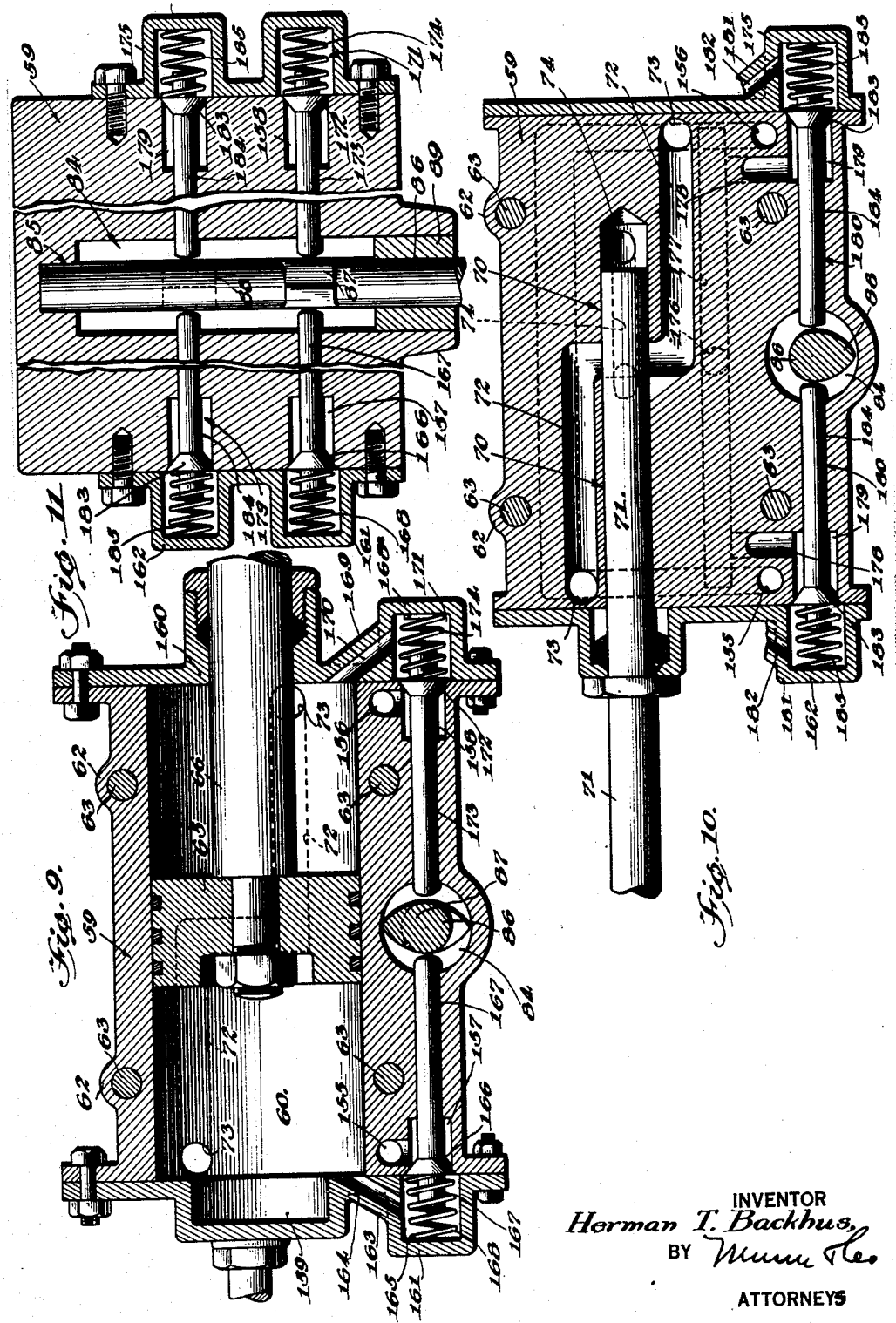
INVENTOR
Herman T. Backhus,
BY
ATTORNEYS

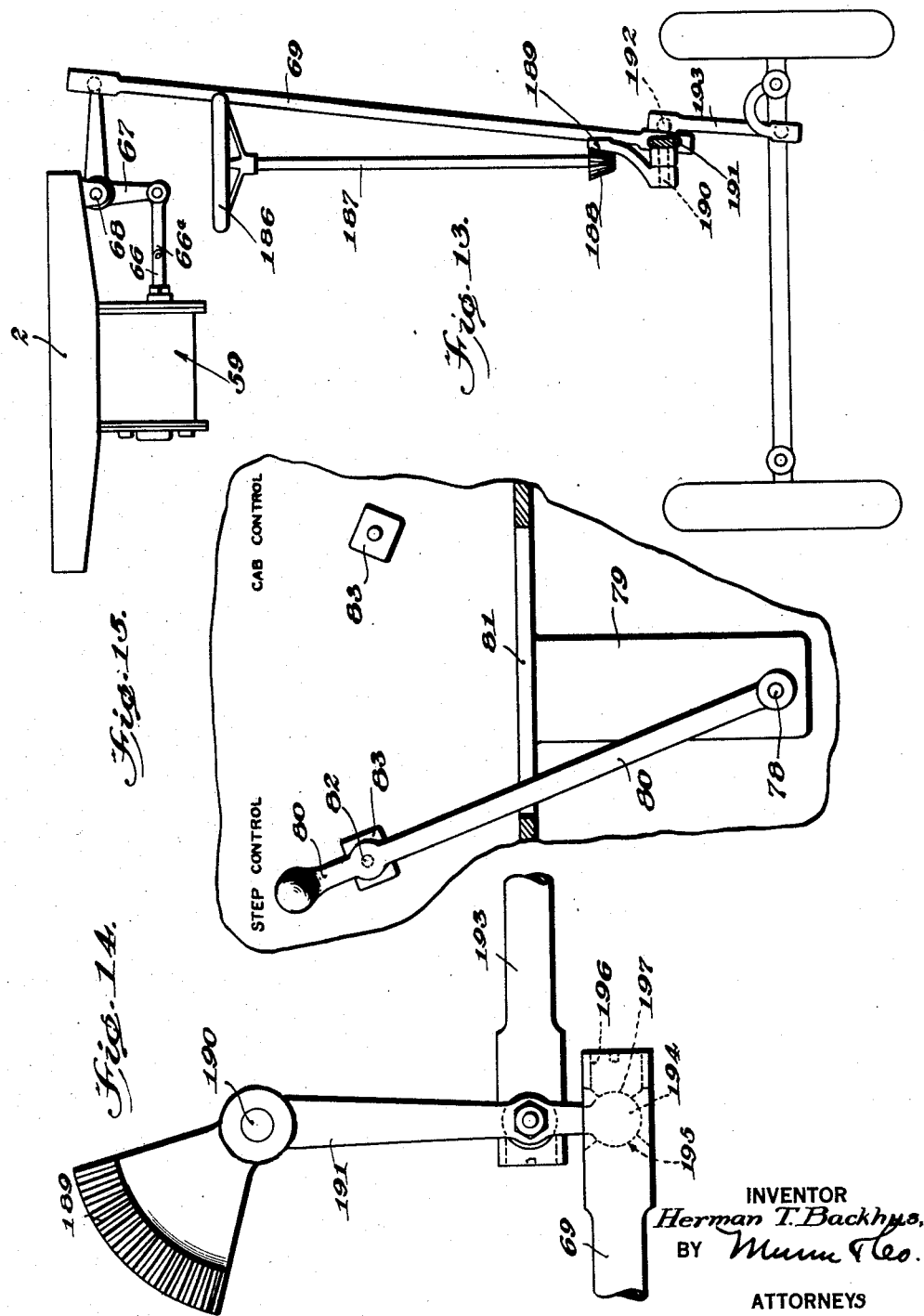

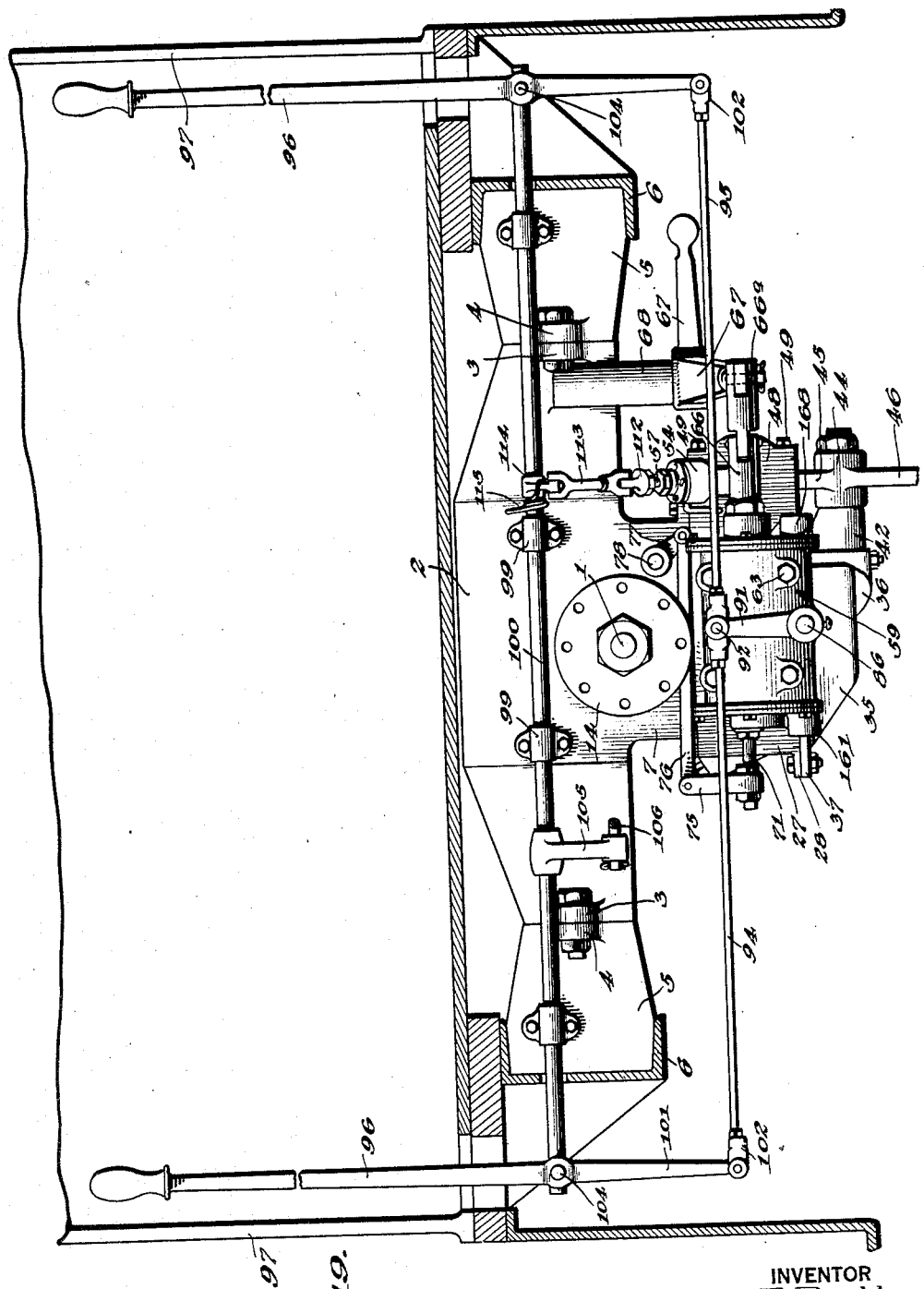

Patented Feb. 18, 1930

1,748,041

UNITED STATES PATENT OFFICE

HERMAN T. BACKHUS, OF WOODRIDGE, NEW JERSEY

AUXILIARY CONTROL FOR MOTOR VEHICLES

Application filed January 30, 1928. Serial No. 250,614.

This invention relates to the motor vehicle art, more particularly to auxiliary controlling or driving means for motor vehicles, and consists in the constructions, combinations and arrangements herein described and claimed.

In the operation of motor vehicles for door to door or shortly separated deliveries or collections, as in the retail delivery of milk and collection of empty bottles, the driver loses much time and restricts the territory which he can cover or make deliveries to by reason of the time lost in moving back and forth from the bottle discharging and receiving portion of the motor delivery wagon, usually now at the side of the body, to the driver's seat at the front. Since for reasons of economy, the same operative both drives and makes deliveries, it will be seen that with a restricted time within which to make deliveries, the time thus lost restricts the size of the territory which may be served by one motor delivery truck, and in large dairy operations, represents, by reason of this loss of time, an added investment in motor delivery vehicles and an added expense in an increased number of employees.

An object of the present invention is the provision of auxiliary controlling means for motor driven vehicles which will enable the operative, in his door to door, or short-stop delivery zone to control the operation of the vehicle from the delivery or collecting door or opening.

A further object is the provision of an auxiliary controlling mechanism of this type powered through the motor drive of the vehicle with means adjustable at will to condition the vehicle for operation by said auxiliary control or independently thereof by the normal control of the vehicle. "Control" is used in the sense of the normal functions of the vehicle control, namely, speed, direction, clutch operation, and braking.

From another aspect, an object of the invention is the provision of auxiliary, and as shown, remote, controlling means for the normal driving mechanism of the motor vehicle, with the two controls arranged to be conditioned so that the one or the other may be operated as desired. Such an arrangement enables the motor vehicle to be driven through its normal control and at normal or high speeds from a loading point to the beginning of its delivery or other house to house or short spaced delivery points, when the auxiliary control may be conditioned to function at a desired speed for the extent of the delivery or collection route.

A further object of the invention is the provision of an auxiliary control of the type described operating through fluid pressure and powered through the motor drive of the vehicle, with means by which the power therefor may be used or disconnected for auxiliary and normal control respectively.

A further object of the invention is the provision of means in the form of an auxiliary control for motor driven vehicles which functions also as an additional and emergency braking means for the vehicle thereby increasing the safety factor.

Another object of the invention is the provision of an auxiliary controlling mechanism for motor vehicles powered from the motor drive and cooperating with the normal power transmission, steering and braking mechanisms thereof when conditioned for operation, with means for operatively and inoperatively conditioning said auxiliary mechanism to function, said mechanism being constructed and arranged, when inoperatively conditioned, to permit normal operation of the normal control of the vehicle without interference.

A further object of the invention is the provision of auxiliary control mechanism for a motor driven vehicle embodying steering control mechanism cooperating with and operating the normal steering mechanism of the vehicle when the auxiliary control is conditioned to function, and effective in the normal operation of the vehicle to improve the steering operation. As shown, the auxiliary control provides a dash pot acting to cushion road shocks transmitted to the steering connections.

These and other features and advantages will be more clearly apparent from the following detailed specification when read in conjunction with the accompanying drawings forming part thereof and in which:

Figure 1 is a view in side elevation of a motor delivery wagon with the auxiliary control mechanism applied thereto, the lower part of the body and the chassis frame being broken away to disclose the operative relation of the normal and auxiliary control.

Figure 2 is a view in front elevation of the auxiliary unit as shown in Figure 1, the chassis and body being removed.

Figure 3 is a longitudinal transverse section through the unit taken on the line 3—3 of Figure 2.

Figure 4 is a view in side elevation of the unit with parts broken away to show the brake control cylinder and its plunger valve.

Figure 5 is a longitudinal vertical section through the unit taken on line 5—5 of Figure 3.

Figure 6 is a fragmentary longitudinal vertical section through the pump, brake and steering cylinders taken on the line 6—6 of Figure 5.

Figure 7 is a rear end elevation of the unit on an enlarged scale showing the unit brake and its operating connections.

Figure 8 is a transverse vertical section through the pump, brake cylinder, and oil reservoir, taken on the line 8—8 of Figure 3.

Figure 9 is a transverse vertical section through the steering cylinder and its valve-operating cam shaft taken on line 9—9 of Figure 5.

Figure 10 is a transverse vertical section through the steering cylinder frame and the cam shaft showing the fluid inlet, exhaust and by-pass passages, the section being taken on line 10—10 of Figure 5.

Figure 11 is a fragmentary transverse section through the cam shaft and valves taken on line 11—11 of Fig. 5.

Figure 12 is a detail perspective of the cam and shaft.

Figure 13 is a detail in plan view of the connection from the steering cylinder to the normal steering control of the vehicle.

Figure 14 is a detail on an enlarged scale of the connecting drag link from the steering cylinder to the normal control steering lever and rod.

Figure 15 is a detail of the cab mounted lever for changing the operation of the vehicle from cab or normal control to side or auxiliary control and vice versa.

Figure 16 is a detail of a pump operating arm, detached.

Figure 17 is a detail perspective of the connection from the auxiliary control unit to the normal accelerator control of the vehicle.

Figure 18 is a detail of the connection from the auxiliary unit brake control to the normal control emergency brake rod.

Figure 19 is a transverse section taken through the vehicle body and chassis showing the dual arrangement of the main control levers for the auxiliary control mechanism with the latter shown in front elevation.

Figure 20 is a vertical section on line 20—20 of Figure 6 showing the by-pass control of pump pressure.

In all main views in the drawings, the movable parts of the auxiliary control unit are shown in their operating positions with the vehicle moving and operated through the auxiliary control.

As a preliminary to a detailed consideration of the different features of this auxiliary control, a brief statement of its operation and its cooperation with the normal operating units of a motor driven vehicle is in order and will aid in understanding the purpose and functioning of the parts of the auxiliary control mechanism.

This control is effected through fluid pressure means and is powered through the normal motor drive of the vehicle. A pump for forcing the fluid, preferably heavy oil, under pressure to the various operating controls is arranged to be operatively or inoperatively connected with the motor drive shaft, a connecting and disconnecting control lever being conveniently positioned in the driver's cab. The auxiliary mechanism is coupled as a unit in the drive shaft extending from the vehicle transmission case to its rear axle or differential. When the control lever in the driver's cab is moved to "cab control" position, the auxiliary control is inoperative and the vehicle is driven from the driver's seat or cab in the normal manner. When the point at which house to house delivery begins is reached, the control lever is shifted to "side" to auxiliary control and the transmission lever is shifted to "second" or to "low" speed, as may be desired. From this point on, the vehicle is driven, accelerated and steered through the "side" or auxiliary control, the operator standing or sitting at the delivery or side entrance, as shown, part of the vehicle and through a single control lever for the auxiliary unit causing the vehicle to be driven, steered and braked, movement of the auxiliary control lever to propelling position letting in the clutch and operating the accelerator, and reverse movement disengaging the clutch and operating the braking means which, as shown, is constituted by a brake operating upon a drum on the propeller shaft and comprising part of the auxiliary unit, and by a connection to the emergency brake rod of the normal vehicle control which is operable independently of said connection. Steering is accomplished through control connections from the control lever to a fluid operated steering cylinder, steering movement of the lever being at right angles to propelling or driving movement.

The motor driven vehicle to which the auxiliary control mechanism of the present invention is to be applied may be of any suitable type permitting preliminary adjustment of the transmission for different speeds. A motor driven vehicle is shown having a transmission T of the sliding gear type shifted for different speeds through the usual gear shift lever L and having the usual clutch pedal C and accelerator A connected through the accelerator shaft S and appropriate connections with the carbureter. The usual drive shaft and tube extending from transmission to differential is displaced by three sections of drive shaft coupled by universal joints J, the intermediate section of drive shaft forming part of the auxiliary control mechanism of the present invention.

The usual emergency and foot or service brakes are, of course, part of the normal controlling mechanism of the vehicle and are not illustrated, although the brake operating rod R extending from the emergency brake lever (not shown) to the usual external contracting emergency brakes on the rear wheel brake drums is shown in Figures 1 and 18 to illustrate the cooperation of the auxiliary control mechanism therewith. The auxiliary control mechanism, is, as shown, mounted at that point longitudinally of the vehicle corresponding to the service or delivery door thereof, which as shown, is located at opposite sides of the wagon body rearwardly of the driver's compartment or cab.

The auxiliary control unit houses a section 1 of the drive shaft of special construction. The unit itself is mounted in housings which for convenience in manufacture, may consist of five separate castings joined together as a unitary structure extending transversely of the chassis and connected at its ends and supported by two special end castings mounted in the channel frame of the chassis at opposite sides thereof. These housings provide (1) a pump chamber, pump and connected fluid reservoir and feed lines; (2) a braking and clutch control cylinder; and (3) a steering control cylinder; the two cylinders being operated through fluid placed under pressure by the pump and flow of fluid under pressure to these cylinders being controlled by (4) the manipulation of a main control lever and its associated connections. Manipulation of this lever is also effective through connections to the accelerator shaft to cause propulsion of the vehicle through its normal transmission and its control or shift lever.

Before explaining in separate detail the four mechanisms above enumerated under their respective headings, it is perhaps best to clear the way by a description of the assembled housing unit as mounted in the chassis frame. Referring particularly to Figures 19 and 2 showing the general assembly in front elevation; Figure 4 in side elevation; Figure 5 in longitudinal vertical section and Figure 8 in fragmentary transverse vertical section, it will be seen that a main upper casting 2 of rectangular cross section and elongated form extends transversely of the chassis frame, its upper surface tapering down at its ends which are faced off square and provided with laterally offset ears 3 (Figures 2 and 4) bolted to corresponding alined ears 4 laterally offset from the inner faces of end blocks 5 (Figure 19) which may conveniently be castings tapered upwardly toward their outer ends and shaped to seat in the channel 6 of the chassis frame to which they are rigidly attached. The elongated casting 2 midway of its length is formed with a downward extension 7 (Figs. 2, 8 and 19) cored out to provide a bore extending longitudinally of the chassis and forming a pump chamber 8. The front and rear faces of the extension 7 are formed with alined circular openings alined longitudinally of the chassis within which are seated ball bearings 9, the inner rings of which are mounted upon and journal the drive shaft section 1 therein, this drive shaft section extending through the pump chamber 8 with its ends projecting therebeyond. The alined openings housing the ball bearings are provided with external bosses 10 to which are bolted the outer flanged edges 11 of shaft collars 12 having packing glands 13 therein seating on the shaft 1. The forward end of the shaft 1 is tapered downwardly and threaded and has mounted thereon a flanged coupling sleeve 14 retained thereon by the nut 15 threaded on the shaft end, the flange of the sleeve being coupled to the flange of the standard universal joint coupling J at the rear end of the first drive shaft section whose forward end is coupled by a similar joint J to the transmission shaft. The rear end of the shaft section 1 extending beyond the collar 12 is similarly tapered and threaded at its end and mounts a similarly flanged sleeve 16. The annular shouldered webbing 17 of a brake drum 18 is bolted to the edge of the sleeve flange, the connecting bolts 19 likewise serving to couple thereto the flange of the standard form of universal joint coupling J connecting drive shaft section 1 to the third and rear section of the drive shaft connecting with the differential and rear axle of the vehicle.

The bottom of the extension 17 of housing casting 2 is open and provided at its side edges with flanges 19 extending lengthwise of the chassis. The portion of the drive shaft section 1 within the pump chamber 8 carries a longitudinally extending series of cams 20, 21, 22 and 23 edged by collars 24 serving as guides and retaining flanges for the edges of coacting cam rollers 25, Figures 5 and 8 which with their connectings to the pump plungers will be described in detail later.

A second casting provides a top plate 26 closing the bottom of the extension 17 and having its sides extended under the side flanges 19 and bolted thereto. The contacting faces of the castings will be machined to provide a tight fit. At one side, the second casting has a vertical side wall 27 (Figure 8) depending from its junction with a flange 19 and terminating in an outwardly flanged lower edge 28. Inset from the opposite side of the casting and extending longitudinally of the chassis and casting from end to end of the latter is a plunger block 29 depending from the top plate 26 and terminating in line with the flanged lower edge 28. The top plate 26 at its rear edge is provided with a transversely extending flange 30 (Figure 5) merging into the plunger block 28 underlying and bolted to the bottom edge of the extension 17 at its rear side. The second casting has front and rear walls 31 merging with the side wall 27 and with the adjacent face of the plunger block 29 forming a compartment providing the upper half of an oil or other fluid reservoir. A filler tube 32 integral with the side wall 27 extends diagonally outwardly therefrom and is closed at its upper end by a filler plug 33. The fluid compartment formed by the walls 27, 31 and the side of block 29 is open at its bottom. This bottom is closed by a bottom plate casting 34 having a tapering front wall 35, a well 36 at its base, and side edge flanges 37 and 38, bolted respectively to the flange 28 of wall 27 and to the plunger block 28 as seen in Figure 8. The upper edges of the bottom plate 34 at the front and rear thereof are provided with flanges 39 and 40, the former being bolted to the underside of the plunger block and the latter bolting to a flange 41 parallel to flange 30 and formed at the rear bottom edge of the plunger block. From the side wall of the bottom plate 34, a large boss 42 extends laterally outward and carries a pivot stud 43 upon which is journaled the hub 44 of a three armed lever, best seen in Figure 4. The upper arm 45 is connected with the plunger of the brake cylinder (later to be described), the lower arm 46 to the emergency brake rod and the intermediate arm 47 to brake shoes for the brake drum 18 on the drive shaft section 1. These connections and their associated parts will be described in detail later under appropriate headings.

Above the hub 44 of this three armed lever, a fourth casting 48 (Figures 2, 4 and 8) is positioned with its inner side face against the side face of the plunger block 29 and underlying the top plate 26 and flange 19. Long machine screws 49 are inserted through bosses 50 on the outer face of the casting and extend through bores therethrough into threaded engagement with threaded bores formed in the side wall of the plunger block. The casting 48 is cored out longitudinally of the chassis to provide a cylinder 51 housing a brake actuating piston 52 and piston rod 53 projecting beyond the rear end of the cylinder casting as shown in Figure 4 and pivotally connected to the upper arm 45 of the three armed lever adjacent to its upper end. At the front end of the casting, a diagonal upward tubular extension 54 is provided in which a plunger valve 55 with a conical lower end 56 seats. A stuffing box through which the stem 57 projects closes and renders it fluid tight. A coiled spring 58 interposed between the plunger and cap normally tends to thrust the plunger downwardly. The stem 57 as well as the plunger valve 55 will be described later in detail as to connections and functions.

The fourth, or brake and clutch control cylinder casting is, as above stated, attached to the side face of plunger block 29. To the adjacent front face 31 of the casting including the plunger block is secured a fifth casting 59 cored to form a steering control cylinder 60 (best seen in Figures 2, 4 and 6) and various fluid pressure and exhaust ducts. The pump plunger block 29 is cored or drilled to provide a main fluid pressure duct 61 with which pressure ducts cored out or drilled in the castings 48 and 59 communicate. The ducts and their functioning will be described later in detail in connection with their control cylinders.

The mounting of the steering control and braking and clutch control cylinders in juxtaposition on adjacent faces of the pump plunger casting facilitates the attachment thereto of operating connections from a common operating lever. The steering control cylinder is provided with four bosses 62 on its front face and with alining bores through which long machine screws 63 (Figures 2 and 6) extend into threaded engagement with threaded bores formed in the front wall 31 and the plunger block 29. Adequate support for the ends of the machine screws in the walls 31 is provided by bosses 64 (Fig. 6). A piston 65 and rod 66 is mounted in the cylinder 60 with the piston rod extending through and beyond the end of the cylinder and has its end pivotally connected through a link 66ª to the end of one arm of a bell crank lever 67 (Figure 13) pivoted upon a tubular boss 68 cast upon the front face of the main casting 2, and connected through its other arm by a ball joint to a long drag arm 69 connecting with the normal steering mechanism of the vehicle as will be later described in detail.

The cylinder 60, as will be seen from Figures 5 and 6, is located at the front and upper side of the casting 59, leaving a solid portion of block at its rear which is formed by coring, or boring and plugging, as is most convenient in manufacture, with a series of fluid passages, later to be described in detail and including a bore 70 (Figure 10) guiding a plunger valve 71 and intersecting and controlling a bend in a by-pass duct 72. The opposite ends of this duct communicate through counter bores 73 with the interior of the cylinder 60 at its opposite ends and at opposite sides of the piston 65. The inner end of the bore 70 communicates through a counter bore 74 (Figures 6 and 10) with the fluid reservoir and when the plunger valve 71 is withdrawn to open the by-pass, permits fluid passing therethrough to escape to the reservoir and prevents back pressure against the sides of the piston.

The plunger valve 71 extends outwardly from the cylinder and laterally of the chassis (Figure 2) and has bolted to its threaded end, the lower end of a yoke arm 75, the upper end of which is pivoted to the one end of an operating link 76. The other end of this link is bifurcated and pivoted to the end of a crank arm 77 keyed to a pump control shaft 78 which, as shown in Figure 3 is journaled in bosses 79 formed internally upon the front and rear walls of the pump chamber 8 and carries an elongated cam arm 80 rotatable to engage the ends of four arms 81 (Figure 8) mounted upon a hinge pin 82 having its ends seated in the front and rear walls of the pump chamber 8 (Figure 3) and having spacing sleeves 83 thereon to position these arms in alinement with cams 20, 21, 22 and 23 on the drive shaft section 1. These arms are formed with intermediate slots 84 (Figure 16) therein which are journaled cam engaging rollers 25 and with slots 85 adjacent to their free ends in which are journaled rollers 86 positioned to engage a series of four alined pump pistons 87 whose operation will be more fully detailed hereinafter.

The pump control shaft 78 extends forwardly from its cylinder casting and is journaled in a bracket 79 (Figs. 1 and 15) depending from the underside of the vehicle body adjacent to the edge of the driver's seat. Its end projects beyond the bracket and has affixed thereto the lower end of a control shifting lever 80 which extends upwardly through a floor slot 81 and carries a suitable locking pin 82 engaging in spaced detent plates 83 on the side of the driver's seat. Movement of the lever 80 to opposite detent positions will rock the pump control shaft 78 to move its cam arm 80 either to depress the arms 81 to clear their rollers 25 from the path of cam movement or to move the cam arm 80 away from arms 81 and permit the pump plunger springs through rollers 86 to move said arms upwardly to hold the cam rollers 25 against their cams for pressure creating pump operation. Such movement of the lever 80 and shaft 78 will also and coincidently through crank 77, link 76, and yoke 75 move the plunger valve 71 and as will be later explained in detail will close the by-pass and permit steering operation by auxiliary control or open the by-pass and permit normal control of the steering. The upper face of the casting below the crank is dished below the crank 72 to permit swinging movement thereof as shown in Figure 5.

The space in the casting 59 below the cylinder 60 is cored out or bored to provide a cam shaft chamber 84 (Figure 5) counter-bored at its rear end to provide a journal seat for the inner end of a shaft 86 carrying oppositely disposed cams 87 and 88 and extending outwardly of the chamber through a bore in a plug 89 closing the outer end of the chamber and retained therein by a set screw 90. The cams 87 and 88 operate certain valves controlling the inlet and exhaust of fluid under pressure at opposite sides of the piston 65 as will be explained later. The cam shaft is actuated through a crank arm 91 keyed to its outer projecting end and having its free upper end bifurcated and journaled on pins 92 outstanding from the opposite sides of a tubular coupling sleeve 93 having actuated rods 94 and 95 threaded into its opposite ends, these rods connecting with main auxiliary control levers positioned at opposite sides of the vehicle at the discharge or collection door.

We now come to the main controlling levers and their connections for the auxiliary controlling mechanism. Referring more particularly to Figures 1, 2 and 19 of the drawings, it will be seen that duplicate main control levers 96 extend through slots in the flooring of the vehicle at the edges of its opposite collection or discharge doors 97 (Figure 1). Upon the front face of the upper casting 2 there are formed transversely alined spaced journal blocks 98 (Figure 5) with which the complemental sections 99 of the journal blocks house and journal therein an operating rock shaft 100 extending beyond the ends of the upper casting 1 to points beneath the main control levers 96. These control levers, as best seen in Figures 2 and 4, are formed at a point intermediate their ends with bent portions 101, the lower ends of which loosely pivot in tubular couplings 102 into the inner ends of which the outer ends of the rods 95 are threaded. This connection provides means operable from the main control lever 96 for actuating the cam shaft 86 controlling the functioning of the steering cylinder 60. Connection with the main operating shaft 100 is afforded, as will be seen from Figures 2 and 4, by flattening the outer ends of the shaft 100 and forming the levers 96 at the point of junction of their lower bent ends and with their upper straight ends with elongated slots 103 therein seating over the flattened ends of the shaft 100 to impart rocking motion thereto by movement of the levers 96 toward the front and rear of the vehicle. Levers 96 at this point are also pivoted to the flattened ends of said shaft by means of pivot studs 104 inserted through the slotted portions of the levers and through the flattened ends of the shaft permitting swinging movement of the levers 96 transversely of the vehicle. This swinging movement of the control levers 96 will, as previously explained, function through the connecting rods 95 to rock the cam shaft 86 in one direction or the other to cause reverse direction of movement of the steering control piston 65 and control the steering of the vehicle as later to be explained.

Rocking movement of the shaft 100 through backward pull on either of the control levers 96 effects (1) propulsion of the vehicle through operation of the accelerator, and (2) lets in the clutch and releases the brakes. In the reverse or forward movement of the control levers 96 and of the rock shaft 100 the feeding of gas is arrested by closing the throttle, the clutch is retracted and the brakes actuated.

Propulsion through the accelerator is effected by means of a crank arm 105 fixed to and depending from the shaft 100 (Figure 2) and having connected thereto the rear end of a rod 106 which extends forwardly and as shown in Figure 17, is pivoted to the lower end of a crank arm 107 mounted upon the accelerator shaft S and having a laterally offset arm 108 overlapping a second crank arm 109 to the lower end of which the shank 110 of the accelerator A is pivoted. From the lower end of this crank 109 extends the usual connecting rod 111 to the butterfly valve of the carbureter. The overlapping offset 108 permits the normal driver actuation of the accelerator in the normal control of the vehicle and causes the same actuation and acceleration by backward movement of either of the control levers 96.

Backward movement of either of the control levers 96 is effective to lift the plunger valve 55 of the brake cylinder 52 against the tension of spring 58 through the following connections. The stem 57 extending outwardly from the plunger valve 55 is threaded into a coupling 112 (Figures 2-4) which in turn is pivoted to the bifurcated lower end of a connecting link 113. The upper bifurcated end of this link embraces and is pivotally connected to the forward end of a crank 114 fixed upon the rock shaft 100 and normally forced downwardly by means of a coil spring 115 encircling the shaft 100 with one end bearing against the face of the block or casting 2 and the other end overlying and engaging the upper edge of the crank 114. This spring has the function of returning the levers 96 forwardly when released. The result of the lever effected movements of the plunger valve 55 leads us to a detailed consideration of

The braking and clutch control

The plunger 55, in the position shown in Figure 4, represents its position when a lever 96 is pulled backwardly, the plunger being raised so that its lower end is above an exhaust port 115 in the end of the brake cylinder permitting oil or other fluid within the brake cylinder to be discharged through the port 115 into the bottom of the plunger chamber and through a port 116 returning from the bottom of the said chamber to the oil reservoir. This movement is automatically effected by reason of the pressure of the clutch spring acting through the link 117 connecting the arm 118 of the clutch pedal C with the upper end of the arm 45 of the three armed lever which has been previously referred to and which at a point below the connection of the link 117 is pivoted to the projecting end of the piston rod 53 of the brake cylinder. This action of the clutch spring is permitted by reason of the cutting off of the fluid pressure on the piston 52 through raising of the plunger valve 55 through rearward movement of the lever 96. The plunger valve 55 is provided adjacent to its upper end with an L shaped port 119 which in the lowered position of the plunger through release of a lever 96 and downward movement of the crank 114 through its spring, connects the intake port 120 in the upper end of the brake cylinder with a fluid pressure feed passage 121 cored out or bored in the casting 48 (see Figure 6) and communicating with the pressure feed duct 61 through a bore through the wall 29 of the casting. A check valve 122 is seated in an enlargement of the intake passage.

The coiled spring 115 normally acts to move the lever 96 forwardly and the stem 57 downwardly when the lever 96 is released. As a safety precaution, an enlargement 541 at the inner side of the tubular extension 54 is provided, this enlargement being formed with a bleed passage 542 (Figs. 2 and 4) communicating with feed passage 121 and with the interior of the extension 51 at its upper end below the stuffing box so that fluid pressure will act against the plunger 55 and move it down to brake applying position except when the lever 96 is pulled backwardly to lift the plunger 55 for brake release, the pressure fluid being forced back through the by-pass or bleed passage 542 into passage 121 by this movement. The stuffing box 56 provides a fluid tight upper end for the tubular extension 54 so that the fluid ahead of the plunger 55 cannot leak out.

In order to provide for adjustment of the brake actuating movement of the piston 52 and adjust the throw of the brakes, a set screw 123 is threaded through a bore in the end of the cylinder 51 to abut and adjustably to space the rear end of the piston from the intake and exhaust end of the cylinder 51. In the brake applying and clutch operating movement of the piston 52 provision is made for exhausting the air ahead of the piston by means of an air duct 124 in the piston rod 53 communicating with the exterior of the cylinder at the open bifurcated end of the piston rod.

Movement of the piston 52 to the right from the position shown in Figure 4 effected through the admission of fluid under pressure to the cylinder through the port 119 and inlet passage 120 will move the clutch link 117 backwardly, throw the clutch pedal C forwardly and throw out the clutch. At the same time, the arm 45 of the three-armed lever is moved rearwardly of the vehicle pulling the intermediate arm 47 downwardly and moving the lower arm 46 forwardly. Movement of the lower arm 46 forwardly may and as shown is utilized to operate the emergency brakes of the vehicle as follows:

Referring particularly to the showing in Figure 18, it will be seen that the emergency brake actuating rod R which is connected with the usual hand emergency brake of the vehicle (not shown) is provided with laterally extending pins 125 guiding in opposed slots 126 in a sleeve 127 sliding on the brake rod R and having a downwardly extending arm 128 with its forwardly bent end 129 pivoted to the rear end of a link 130 whose front end is pivoted to the lower end of arm 46. The slot 126 permits normal operation of the hand emergency brake of the vehicle without interference with the sleeve 127 and permits said sleeve in the forward movement of the arm 46 of the three armed lever to engage the pins 125 and similarly actuate the emergency brake.

The downward movement of the intermediate arm 147 of the three armed lever through actuation of the brake cylinder piston to the right in Figure 4 operates brake shoes cooperating with the brake drum 18 in the following manner. Referring more particularly to Figures 4, 5 and 7, it will be seen that studs 131 project rearwardly from the rear face of the upper casting 2 and pivotally mount the upper end of complemental brake shoe arms 132 which may be of any suitable construction, but which as shown are provided intermediate their upper and lower ends with trunnion pins 133 upon which are clamped split bearings 134 formed at the the rear face of brake shoes 135 adjusted with respect to the perimeter of the brake drum 18 by means of set screws 136 inserted through bosses 137 formed on the sides of the arms 132, the inner ends of the set screws bearing against the brake shoe 135, the opposite sides of the pivot pins 133 to center the curved faces of the brake shoes relatively to the perimeter of drum 18. A stud 138 projects rearwardly from the rear face of the cover plate 34 in vertical alinement with the shaft 1 and has mounted thereon for oscillation a rocking link 139 which is mounted on the stud 138 at its central point. The upper end of the rocking link 139 is pivotally connected to a rod 140 threaded at its outer ends and extending through a bore in the flattened intermediate portion of a pivot stud 142 journaling in the lower bifurcated end of the arm 132. The rod 140 is held in adjusted relation to the stud 142 and the spacing of the brakes from the drum regulated by means of spacing sleeves 143 and lock nuts 144. The lower end of the link 139 is similarly connected to the opposite brake shoe arm 132 through a similar link 140 and connections as previously described and similarly numbered. The link 139 is rocked to apply and release the brake shoes by means of a lateral arm 145 which may be cast or forged integrally with the link and pivotally mounts at the outer end a downwardly extending coupling link 146 having its opposite ends bifurcated at right angles and embracing respectively the end of arm 145 and the end of arm 47 pivotally interconnecting these parts. Downward movement of the arm 47 will, therefore, through this connection effect a downward movement of the arm 145 rocking the upper end of the link 139 to the left and the lower end to the right applying the brake shoes to the drum 18. This operation is coincident with the previously described application of the emergency brake and the retraction of the clutch, and takes place when the control lever 96 is either moved forwardly by hand or released and moved forwardly through the coil spring 115 reacting on the lever and directly effecting downward movement of the crank 114 and lowering of the plunger valve 55, this plunger movement causing the flow of fluid under pressure against the piston 52 and the movement of the clutch link 117 and lever arm 145 to retract the clutch and operate the brakes as described. It will be obvious that reverse movement of the plunger through the backward pull on the lever 96 to start the propulsion of the vehicle forwardly will lift the plunger valve cutting off fluid pressure from the cylinder and permit the clutch spring to exhaust the fluid from the cylinder and retract the brakes. The reference in the preceding discussion to the fluid pressure passage 61 in the plunger block 29 makes it now desirable to discuss in detail the construction and operation of

*The fluid pressure pump*

Referring more particularly to Figures 3, 5, 6 and 8, it will be seen that the pump plunger block 29 is bored vertically at spaced intervals to provide cylindrical bores 147 in which the pump pistons 87 seat. The bores 147 extend approximately to the lower end of the block 29 where they are reduced in diameter and threaded at their lower ends to receive the threaded upper ends of the intake tubes 148. The bores of these intake tubes midway of their length are reduced to provide a seat for a ball check valve 149 and at their upper threaded ends inserted in the lower threaded ends of the cylindrical bores that likewise form a seat for a larger ball check valve 150. The annular shoulders 151 provided by the reduction of the cylindrical bores seat the lower ends of coil springs 152, the upper ends of which seat in annular sockets 153 formed in the lower heads of the pistons 87. These springs normally tend to elevate the pistons causing their heads to engage the rollers 86 and force the arms 81 forwardly to maintain the rollers 25 in contact with the peripheries of their cams 20, 21, 22, 23. These cams when the rollers 25 are held in engagement therewith by the springs 152 are effective to cause a depression of the pistons with each rotation of the cam forcing the oil or other pressure fluid drawn upwardly into the lower portions of the cylinders by the previous spring effected upward movement of the pistons outwardly through passages 154 cored out of or bored in the block and into the main fluid pressure passage 61 common to each of the passages 154 and extending lengthwise of the plunger block 29 as clearly shown in Figures 6 and 8. The lower ends of the feed tubes 148 are positioned adjacent to the well or sump 36. It will be obvious so long as the rollers 25 are permitted to contact with their cams, the rotation of the shaft section 1 through the motor of the vehicle will cause the arms 81 operating with their rollers 86 against the pump pistons to force oil or other fluid under pressure into the main fluid pressure passage 61 to operate the pistons of the brake and steering cylinders 51 and 60 respectively. Movement of the pump control lever 80 (Figure 15) from the "step control" position shown in which the cam shaft 78 is turned to the position shown in Figure 8 permitting the rollers 25 to contact with their cams and the pump to operate, to the "cab control" position moves the elongated cam 80 downwardly as indicated in Figure 8 engaging its edge with the end of the arms 81 and forcing the arms downwardly against the tension of the springs 152 of the pump cylinders to hold the cam rollers 25 out of engagement with their cams. In this position of the parts, the pressure under which the oil or other fluid is placed by the pump ceases. This positioning of the control lever 80 is effected when the vehicle is to be driven through its normal control. The check valves 149 and 161 serve to maintain a supply of fluid beneath the pistons so that as they are again permitted to operate, pressure of the fluid is immediately obtained. As has been previously explained in the description of the operating of the brake and clutch control cylinder, fluid under pressure from the pumps enters the inlet passage 121 of the brake cylinder block 148 through the ball check valve 122 and is returned to the reservoir chamber 34 through the discharge passages 115—116. The main pressure fluid supply passage 61 also connects with an intake to the other controlling unit of the auxiliary control mechanism and this now leads to a discussion of the

*Steering control cylinder*

As seen from Figure 2 and as previously described, the steering control cylinder 59 is positioned at the front side of the fluid reservoir and secured thereto by a plurality of machine screws or bolts 63. It is secured to the fluid reservoir at the front face thereof adjacent to the side face to which the brake cylinder 48 is secured and its cylindrical bore 60 is positioned at the forward side of the block 59 leaving space for the provision of fluid inlet and exhaust passages. The main fluid pressure intake passage 153 (Figure 6) has a counter-bored portion 154 alining with the fluid pressure passage 61 of the pump block 29. The passage 153 at its opposite ends has downward extensions 155—156 which bend and extend beneath the cylinder 60 as shown in Figure 5 and communicate with tubular chambers 157—158 alined longitudinally of the cylinder block as shown clearly in Figure 9. The opposite ends of the cylinder are closed b ported end plates 159—160 communicating with the passages 157 and 158 as follows: The end plate 159 (Fig. 9) is provided at its lower side with spaced bosses 161 (Fig. 9) and 162 (Fig. 10), the latter forming part of fluid exhaust passages to be subsequently described. The boss 161 which constitutes part of the pressure fluid passage to the cylinder 60 is hollowed and formed with a thickened portion 163 having a bore 164 therein communicating with the interior of the cylinder 60 and with the passage 165 formed by the hollow interior of the boss 161. The passage 165 alines with the tubular passage 157 to which the fluid pressure conduit 155 leads, the edge of the abutting face of the latter being bevelled to provide a seat against which a valve 166 rests. This valve is mounted upon a stem 167 guided in a reduced extension of the passage 157, the end of the stem 167 entering into the cam shaft chamber 84 when its valve 166 is seated. The stem 167 projects beyond the valve and is encircled by a coil spring 168 abutting the inner face of the hollow boss 161 and normally holds the valve 166 seated. When the valve is moved from its seat, fluid under pressure is permitted to enter from the passage 155 into a chamber 157 and to pass to the chamber 165 and bore 164 into the interior of the cylinder 60 at one end thereof. The cover plate 160 at the opposite end of the cylinder is formed with a hollow boss 168ª having an enlargement 169 through which a passage 170 extends into the opposite end of the cylinder, this passage communicating with the chamber 171 formed by the hollow interior of the boss. The tubular chamber 158 communicating with the fluid pressure passage 160 at this end of the cylinder is similarly alined with the chamber 171 and has its abutting edge tapered to receive the face of a valve 172 whose stem 173 is guided longitudinally of the cylinder in an extension of the tubular chamber 158 and in the seated position of the valve 172 extends partially within the cam shaft chamber 84 similarly to the stem 167. The valve stem 173 likewise has a portion extending beyond the valve 172 and encircled by a coil spring 174 seated within and abutting the inner face of the hollow boss 168ª. As in the case of the fluid inlet passage at the opposite end of the cylinder, the valve 172 when moved from its seat permits fluid under pressure to enter through passage 156 in chamber 158, chamber 171 and passage 170 into the cylinder 60 at its end of the cylinder. The end plate 160 is also provided with a boss 175 spaced from the boss 168 and longitudinally alined with the boss 162 formed on the opposite end plate, these last mentioned bosses providing means communicating with the ends of the cylinder and with the reservoir for exhausting fluid from the opposite ends of the cylinder into the reservoir. It will be evident that the cylinder ends 159—160 each are provided with means for admitting fluid under pressure at the opposite ends of the cylinder, and as will be now seen for exhausting fluid from said opposite ends, each end plate having two hollow bosses with adjacent bored enlargements providing intake and exhaust passages.

To provide for the return of fluid to the fluid reservoir, its front wall adjacent to the bore 74 therein is provided with a return bore 176 (Figure 6) communicating with a return passage 177 (Figures 5 and 6) formed by grooving the rear face of the cylinder block 59 abutting the front face of the reservoir wall in alinement with the bore 176. From the opposite ends of this grooved passage 177 transverse bores 178 extend downwardly through the cylinder block to tubular chambers 179 having extensions 180 of reduced diameter in longitudinal alinement which communicate with the cam shaft chamber 84. The opposite ends of the tubular chambers 179 communicate with the hollow interiors of the bosses 162 and 175. Enlargements 181 (Figure 10) at one side of said bosses are provided with ducts 182 extending through the opposite end walls of the cylinder similarly to the ducts 164 and 170 of the fluid inlet passages shown in Figure 9. The outer ends of the tubular passages 179, as in the case of the inlet valves previously described, form seats for valves 183 whose stems 184 are guided by the extensions or bores 180 from the chambers 179. As in the case of the inlet valves, the ends of the valve stems 184 with the valves seated, extend into the cam shaft chamber 84 being normally projected into said chambers and the valves 183 held in closed position by means of coil springs 185.

The cams 87 and 88 on the cam shaft 86 are positioned in alinement with the abutting ends of the alined valve stems of the pairs of exhaust and inlet control valves at the opposite ends of the cylinder block 59. The cams 87 and 88 are disposed at opposite sides of the shaft 86 so that when the shaft is rotated in one direction, the inlet valve 166 or 172 at one end of the cylinder is opened by the cam 87, for example, engaging its valve stem, and at the same time the exhaust valve 183 at the opposite end of the cylinder is opened by the other cam 88 acting against its valve stem. This motion of the cam shaft 86 is secured by the lateral swinging movement of either of the main control levers 96 on their pivot studs 104, throwing the crank arm 91 through links 95 in one direction or the other depending upon the direction which it is desired to steer the vehicle. When movement of the cam shaft 86 occurs to the left as shown in Figure 9, with the vehicle conditioned for auxiliary control and the fluid pumps operating, fluid under pressure entering through passage 153 in the cylinder block 159 and its extension 155 passes beyond the valve 166 and through passage 164 to act against the piston 65 from the left end of the cylinder forcing it toward the right. Coincidently with the opening of the valve 166, the exhaust valve 183 at the opposite side of the cylinder is opened so that the fluid present at the right side of the piston 65 is discharged through passage 182, past valve 183 through the tubular chamber 179, the passage 178 and 177 and exhaust opening 176 to the fluid reservoir. When the cam shaft is rocked in the reverse direction during the reverse swinging movement of a main control lever 96, the reverse action takes place, fluid under pressure entering through passage 156, chamber 158 past valve 172 and through duct 170 to the right hand side of the piston 65 forcing it toward the left and through the discharge duct 182, past valve 183 and chamber 179 out through discharge passage 178—177 and the bore 176 leading back into the fluid reservoir.

The operation of the plunger valve through the cab control lever 80, link 76 and yoke 75 has been previously described. It is sufficient to state that referring specifically to Figure 10, movement of the cab control lever 80 swings the crank arm 77 downwardly and moves the valve plunger 71 to the left, permits the fluid at the opposite sides of the piston 65 to by-pass through ports 73 and passage 72 as in the normal steering operation of the cylinder, the piston rod 66 through its bell crank and link connections to the steering mechanism is moved back and forth. The piston, therefore, acts as a dash-pot cushioning the operation of the steering mechanism. Excess fluid pressure of the oil against the piston during this operation is prevented by reason of the exhaust passage 74 at the end of the bore 70 guiding the plunger valve which permits some of the by-passed liquid to return to the reservoir. We now come to the steering connection between the piston 66 and the normal steering control of the vehicle which as previously stated includes a bell crank 67 connected to the end of piston 66 and a drag link 69 connected by a ball joint to the other end of the bell crank and extending forwardly to the normal steering mechanism. Attention is called specifically to Figures 13 and 14.

The steering wheel 186 with its shaft 187 and pinion 188 is of conventional form, the bevelled pinion 188 meshing with a segmental rack 189, the lower end of which is keyed to an appropriately journalled rock shaft 190. The upper end of an arm 191 is likewise keyed to and turns with the rock shaft and adjacent to its lower end is provided with a laterally offset ball 192 (Figure 13) seating in a socket in the rear end of the steering rod 193 of standard construction. The forward end of which is pivoted to the steering rods of the front construction of the vehicle. These steering connections are conventionally shown since any standard type may be used. The lower extremity of the arm 191 is connected with the forward end of the drag link 69 extending forwardly from the steering cylinder 59 by a ball joint. As shown particularly in Figure 14, the lower end of the arm 191 below the point of its connection with the regular steering rod connection 193 of the vehicle is formed as a ball 194. The forward end of the drag link 69 may be provided with a socket to receive the ball end 194. As shown, the socket is provided by forming the front end of the arm 69 with a bore at right angles providing a fixed semi-cylindrical bearing 195 and by a threaded plug 196 screwing into the axially threaded end of the link 69 and having its inner end formed with a cooperating semi-cylindrical bearing face 197 by means of which the ball end 194 of the arm 191 is jointed thereto with the requisite degree of free movement. Obviously, the plug 196 facilitates and permits the insertion of the ball end 194 in the socket.

It will be evident from foregoing that in the normal operation of the vehicle steering control through the steering wheel 186 and its connections will, through the drag link 69 and bell crank 67 move the piston of the steering cylinder back and forth in the steering cylinder, the oil or other fluid by-passing as previously described and cushioning road shocks. In the steering operation through the auxiliary control, the fluid actuated movement of the piston of the steering cylinder will, through the same connections, similarly steer the front wheels of the vehicle as shown in Figure 13, the steering shaft and wheel turning idly as the movement of the drag link 69 swings the arm 191 through shaft 190 and rocks the segmental rack 189.

*The operation* of the auxiliary control has been detailed as to its various units in the preceding description. To re-capitulate briefly it is assumed that the vehicle is under the normal control of the driver in the cab. The vehicle is driven or has been driven from a loading point to the point at which the door to door delivery or collection is to be made. When this point is reached, the driver brings the vehicle to a stop and moves the control lever under the seat from its cab control position to its step control position. This movement of the lever releases the pump operating arms for actuation through the drive shaft of the motor which is not intended to be switched off when the driver brings the vehicle to a stop. Fluid under pressure passing to the brake cylinder immediately operates the brake and throws out the clutch. The driver now shifts the normal gear shift lever to first or second speed positions as desired and from this point on, controls the propulsion and steering of the vehicle from either one of the side control levers. These levers, being positioned at opposite sides of the vehicle body at the service or delivery door, permits the driver to "cover" both sides of the street on his route without passing around the vehicle. To propel the vehicle forwardly either of the control levers is pulled rearwardly operating through its connection with the accelerator to feed the gas to the motor proportionate to the degree of backward movement of the lever. Steering the vehicle to the left or right is effected by lateral swinging movement of the same lever to the left or right depending upon the direction of movement desired. When a stop is to be made between deliveries, the driver merely releases the side control lever whereupon the spring on the control shaft 100 will automatically move both control levers forwardly, this movement, as before explained, conditioning the control of the braking cylinder to operate the piston of the brake cylinder to throw out the clutch and put on the brakes so that the driver may either release or throw the control lever forwardly and leave the vehicle while in motion to make his deliveries. The unclutching and braking operations will follow and be entirely automatic. To start up again, the lever is merely pulled backwardly conditioning, through its plunger valve, the brake cylinder to exhaust its oil back into the oil reservoir, the discharging movement of the piston being effected through the clutch spring and its connection to the brake piston rod. This movement of the control lever coincidently feeds gas to the motor and starts the vehicle moving forwardly, the stopping and starting operations thereafter being performed and functioning as described, and during the period of rest of the vehicle while deliveries or collections are being made, the motor of the vehicle continues to run and the fluid pressure pump continues to operate. When the end of the delivery route is reached, the operator resumes his position in the driver's compartment or cab, swings the control lever under the seat from "step control" to "cab control" position thereby disconnecting the fluid pressure pump and drive shaft and opening the by-pass of the steering cylinder. The vehicle may now be operated through normal control without interference by the auxiliary control and without affecting or operating the auxiliary control.

It will be evident, with the fluid pressure pump connected to the drive shaft and operating while the vehicle is being driven through auxiliary control or is standing with motor running while deliveries or collections are being made that the fluid may be placed under such great pressure as to cause leakage and possibly damage to the mechanism. I have provided means therefore to control and variably to limit the pressure of fluid in the operating passages as follows:

By referring to Figures 6 and 20, it will be seen that the pressure passage 61 common to and receiving the pressure fluid from all pump cylinders is provided with a counterbore 198, extending vertically downward and enlarged to form a plunger cylinder 199, (Fig. 20) providing a shoulder or seat 200 at its upper end against which the upper end of the plunger valve 201 may abut to close the bore. Below the seat 200 a lateral passage 202 extends through the plunger block 29 and connects the cylinder 199 with the fluid reservoir 31.

The plunger valve 201 is normally held against the seat 200 with adjustable spring pressure predetermining the maximum fluid pressure for the pressure fluid operating lines. When this pressure is exceeded, the plunger 201 will yield downwardly and the pressure will be relieved by the by-passing of the pressure fluid from passage 61 through the lateral by-pass 202 back to the fluid reservoir.

This control of the pressure of the fluid is effected as follows: Referring particularly to Figure 20, it will be seen that the plunger block 28, below the cylinder 199 and in axial alinement therewith, is formed with a cylindrical chamber 203 internally threaded to receive the externally threaded cupped plug 204 on the upper end of an adjusting stem 205 housed in an enlargement 206 (Figs. 8 and 20) at the side of the bottom plate 35 adjacent to its oil sump pit 36. The stem 205 is threaded at its lower end through the bottom plate 35 and has its head slotted for adjustment. A lock nut 207 is used to hold it in adjusted position. The cupped plug 204 seats the lower end of a coiled spring 208 encircling the stem 209 of the plunger valve 201 and abutting at its upper end against the under side of the plunger. The pressure with which the spring acts against the plunger to hold it against seat 200 is, of course, determined by the adjustment of the stem 205 and its cupped plug 204 variably to tension the spring against the plunger. The head 204 and the stem 205 are provided with alined bores in which the stem 209 is guided for fluid pressure effected movement of the piston, a vent 210 being provided for the escape of air or oil from the reservoir from the bore as the stem is forced down therein by the fluid pressure built up by the pump.

The described control, therefore, limits the pressure under which the fluid may be placed by the pump powered through the vehicle drive shaft and enables the maximum pressure obtainable to be varied to suit the particular operating conditions and equipment.

The particular constructions and arrangements disclosed and described herein while representing a preferable embodiment of the invention, are intended as illustrative rather than restrictive, and modifications adapting the invention to different operating conditions and constructions of normal control mechanism are contemplated within the spirit of the invention and the scope of the appended claims.

What I claim therefore and desire to secure by Letters Patent is:

1. An auxiliary control for motor driven vehicles comprising an auxiliary control unit separate and spaced from the normal driving control and powered through the motor drive shaft of the vehicle, said unit having controlling connections to the normal steering, braking and speed accelerating mechanisms of the vehicle including a common control for said connections.

2. An auxiliary control for motor driven vehicles comprising an auxiliary control unit separate and spaced from the normal driving control means of the vehicle and connected to and powered through the vehicle drive shaft, said unit having controlling connections to the normal clutch, speed accelerating, steering and braking mechanisms and including actuating means for said controlling connections.

3. An auxiliary control for motor driven vehicles comprising an auxiliary control unit separate and spaced from the normal driving control means of the vehicle and connected to and powered through the vehicle drive shaft, said unit having controlling connections to the normal clutch, speed accelerating, steering and braking mechanisms and including actuating means for said controlling connections, and control shifting means operable at will to connect said unit in and disconnect it from operative relation to the drive shaft, operatively and inoperatively to condition said unit and normal controlling means for independent vehicle controlling operation.

4. An auxiliary control for motor driven vehicles comprising an auxiliary control unit separate and spaced from the normal driving control means of the vehicle and connected to and powered through the vehicle drive shaft, said unit having fluid pressure operated controlling connections to the normal steering and braking mechanisms of the vehicle, and operating means for said connections having connection with and effective to operate the normal speed accelerating mechanism of the vehicle.

5. An auxiliary control for motor driven vehicles comprising a separate auxiliary control unit mounted upon the vehicle in spaced relation to its normal driving control means and having controlling connections to the normal clutch operating, speed controlling and steering mechanisms of the vehicle and to braking means separate therefrom, said unit including a single means for operating said controlling connections to the normal clutch, accelerating and steering mechanisms of the vehicle independently of the normal controlling means of the vehicle and for additionally operating the separate braking mechanism, and control shifting means operable at will to condition said auxiliary or normal driving control means for operation, the one independently of the other.

6. An auxiliary control for motor driven vehicles comprising a separate auxiliary control unit mounted upon the vehicle in rearwardly spaced relation to its normal driving control means and having controlling connections to the normal clutch operating, speed controlling steering and braking mechanisms of the vehicle, said unit including a common control operable from either side of the vehicle rearwardly of the normal control to actuate said controlling means independently of the normal driving control means to drive, steer and brake the vehicle, said actuating means having operating connection with both the normal braking mechanism for the vehicle and with said separate braking mechanism for coincident operation thereof to brake the vehicle.

7. An auxiliary control for motor driven vehicles comprising a separate auxiliary control unit mounted upon the vehicle in spaced relation to its normal driving control means and having controlling connections to the normal clutch, speed controlling and steering mechanisms of the vehicle and including a separate auxiliary braking mechanism with operating connections thereof, said unit including fluid pressure means powered from the drive shaft of the vehicle and manually controlled pressure-actuated operating connections to said clutch and steering controlling connections and to said separate braking mechanism.

8. An auxiliary control for motor driven vehicles comprising a separate auxiliary control unit mounted upon the vehicle in spaced relation to its normal driving control means and having controlling connections to the normal clutch, speed accelerating, steering and braking mechanisms of the vehicle and including a separate auxiliary braking mechanism with operating connections thereto, said unit including fluid pressure means powered from the vehicle drive shaft and manually controlled pressure actuated operating connections to said controlling connections for the normal clutch, steering and braking mechanisms and to said auxiliary braking mechanism, with control shifting means for conditioning said normal and auxiliary controlling means for independent operation at will.

9. An auxiliary controlling mechanism mounted and operable upon a motor driven vehicle at a point removed rearwardly from its normal driving control mechanisms, and comprising clutch, brake, and steering operating means having operating connections with the corresponding normal control mechanisms, fluid pressure means powered from the motor drive of the vehicle for actuating said connections, and a single manually operable control for said fluid pressure means and their actuated connections, and control shifting means operable at will operatively and inoperatively to condition said motor powered fluid pressure means for driving control actuation.

10. An auxiliary controlling mechanism mounted and operable upon a motor vehicle at a point removed from its normal driving control mechanisms and including fluid pressure operated clutch, steering and braking means having operating connections with the corresponding normal control mechanisms, fluid pressure creating means powered from the motor drive shaft of the vehicle, and manually operated fluid pressure controlling means with means for operatively and inoperatively conditioning said pressure creating means for operation at will.

11. In a motor driven vehicle, normal driver-operable controlling means for propelling, steering and braking said vehicle, a separate auxiliary control unit operatively connected with said normal controlling means and mounted upon the vehicle and operable at a point removed from said normal controlling means, said unit including a separate auxiliary braking mechanism, fluid pressure means powered from the drive shaft of the vehicle, manually controlled pressure operated means for actuating said normal steering and braking mechanisms and for actuating said auxiliary braking mechanism, and connections therefrom to the normal propelling mechanism of the vehicle, with control shifting means operable at will to condition said auxiliary and normal controlling means for independent operation.

12. In a motor driven vehicle, normal controlling means for propelling, steering and braking the vehicle, a separate auxiliary controlling unit mounted upon the vehicle and operable at a point spaced from said normal controlling means, said unit comprising a casing housing a section of the vehicle drive shaft and a fluid compressing pump operated from said shaft, fluid pressure operated connections carried by said casing and in operative connection with the normal steering and braking mechanism of the vehicle, manually controlled actuating means for said fluid pressure connections and a connection from said actuating means to the normal propelling mechanism of the vehicle.

13. In a motor driven vehicle, normal clutch, speed control, steering and braking mechanisms, and a separate auxiliary controlling unit mounted on the vehicle and operable from a point spaced from said normal controlling mechanisms, said unit being mounted to house a section of the vehicle drive shaft and including a fluid reservoir, a fluid compressing pump operated through said drive shaft, fluid pressure operated braking and steering cylinders having connections extending therefrom to and controlling the normal steering, clutching and braking mechanisms of the vehicle, manually operable means for controlling the flow of pressure fluid to said cylinders for braking and steering the vehicle independently of the normal controlling mechanism, a connection from said manually operable means to the normal speed control means of the vehicle effective independently to propel the vehicle, and means operable at will to condition said auxiliary controlling unit and said normal controlling mechanisms for independent operation.

14. In a motor driven vehicle, normal controlling means for operating the clutch, accelerator, steering and braking mechanisms for the vehicle, a separate auxiliary controlling unit mounted on the vehicle and operable at a point spaced from said normal controlling means, said auxiliary unit comprising a casing housing a section of the vehicle drive shaft and a fluid compressing pump and providing a fluid reservoir with means for operating said pump from the housed section of drive shaft, a fluid pressure operated steering cylinder connected to said casing and having intake and exhaust valves at opposite ends thereof and a by-pass connecting its opposite ends, a plunger valve controlling said by-pass, control shifting means operable in one direction to disconnect said pump and drive shaft and coincidently to operate said plunger valve to open said by-pass and in the reverse direction to connect said pump and drive shaft and to reversely position said plunger to close the by-pass, a fluid pressure operated braking cylinder having a piston operatively connected with the normal clutch and brake control of the vehicle, a valve controlling the inlet and discharge of pressure fluid to said cylinder, and a manually operable controlling member in operative connection with the normal propelling mechanism of the vehicle and with the inlet and exhaust valves of said steering and braking cylinders, said operating member in one direction of movement being effective to operate the controlling valves of said braking cylinder to release the brakes and operate the normal clutching mechanism to propel the vehicle and coincidently to operate the accelerating speed controlling mechanism thereof and operative by a different direction of movement to actuate the control valves of the steering cylinder to actuate its piston and its connections to the normal steering mechanism of the vehicle.

15. In a motor driven vehicle, normal controlling means for operating the clutch, accelerator, steering and braking the vehicle, a separate auxiliary controlling unit mounted on the vehicle and operable at a point spaced from said normal controlling means, said auxiliary unit comprising a casing housing a section of the vehicle drive shaft and a fluid compressing pump and providing a fluid reservoir with means for operating said pump from the housed section of drive shaft, a fluid pressure operated steering cylinder connected to said casing and having intake and exhaust valves at opposite ends thereof and a by-pass connecting its opposite ends, a plunger valve controlling said by-pass, control shifting means operable in one direction to disconnect said pump and drive shaft and coincidently to operate said plunger valve to open said by-pass and in the reverse direction to connect said pump and drive shaft and to reversely position said plunger to close the by-pass, a fluid pressure operated braking cylinder having a piston operatively connected with the normal clutch and brake control of the vehicle, a valve controlling the inlet and discharge of pressure fluid to said cylinder and effective in fluid discharge position to permit the clutch spring to exhaust fluid from the cylinder to release the brakes and coincidently to throw in the clutch, and a manually operable controlling member in operative connection with the normal propelling mechanism of the vehicle and with the inlet and exhaust valves of said steering and braking cylinders, said operating member in reverse directions of movement being effective to operate the controlling valves of said braking cylinder to release the brakes and operate the normal clutching mechanism to propel the vehicle and to throw out the clutch and apply the brakes, respectively, and coincidently to operate the accelerating speed controlling mechanism thereof to increase and decrease vehicle speed, respectively, and operative by right angular movement in reverse directions to actuate the control valves of the steering cylinder to actuate its piston and its connections to the normal steering mechanism of the vehicle to steer the vehicle to the right and left, respectively.

16. An auxiliary controlling mechanism mounted upon a motor vehicle and operable at a point removed rearwardly from its normal driving control mechanisms and comprising fluid pressure operated means powered from the motor drive of the vehicle for operating the clutch, brake and steering mechanisms of the vehicle, said means having operating connections with the corresponding normal control mechanisms and a common control, dual control means for said auxiliary mechanism positioned at opposite sides of the vehicle at points removed rearwardly from said normal driving control mechanisms, and means for disconnecting said fluid pressure operated means from the motor drive at will.

17. In a motor driven vehicle, normal driver operable controlling means for propelling, steering and braking said vehicle positioned at the front of the vehicle, a separate auxiliary control unit having fluid pressure controlled means operatively connected with said mechanisms for operation independently thereof and mounted upon the vehicle at a point removed rearwardly from said normal control mechanisms with dual controlling means for said unit positioned at opposite sides of the vehicle, said unit including fluid pressure creating means arranged for operative connection to the vehicle drive shaft, with means operable at will operatively and inoperatively to condition said pressure creating means for operation by the drive shaft.

18. An auxiliary control for motor driven vehicles comprising an auxiliary control unit separate and spaced from the normal driving control means of the vehicle and connected to and powered through the vehicle drive shaft, said unit having controlling connections to the normal clutch, speed accelerating, steering and braking mechanisms and including a fluid pressure operated brake cylinder having coincidently operated controlling connections to the normal clutch and brake operating mechanisms of the vehicle, and controlling means therefor effective by movement in one direction to condition said cylinder to permit the clutch spring to throw in the clutch and exhaust said cylinder to release the brakes and by movement in the reverse direction to cause fluid pressure actuation of the cylinder piston to throw out the clutch and to apply said brakes.

19. An auxiliary control for motor driven vehicles comprising an auxiliary control unit separate and spaced from the normal driving control means of the vehicle and connected to and powered through the vehicle drive shaft, said unit having controlling connections to the normal clutch, speed accelerating, steering and braking mechanisms and including a braking mechanism separate from and auxiliary to the normal braking mechanism of the vehicle, a fluid pressure operated cylinder having its piston provided with coincidently operated controlling connections to the normal clutch and brake mechanisms and to said separate braking mechanisms, and a control lever effective by movement in one direction to condition said cylinder for fluid pressure operation of its piston to retract the clutch and coincidently to apply the normal and auxiliary braking mechanisms, and by reverse movement to permit the clutch to engage through its spring and to condition said cylinder for actuation of its piston by the clutch spring to exhaust the cylinder of pressure fluid and coincidently to release said normal and auxiliary brakes.

20. An auxiliary control for motor driven vehicles comprising an auxiliary control unit separate and spaced from the normal driving control means of the vehicle and connected to and powered through the vehicle drive shaft, said unit having controlling connections to the normal clutch, speed accelerating, steering and braking mechanisms and including a fluid pressure cylinder having pairs of intake and exhaust valves at each end thereof and a valve controlled by-pass connecting said opposite ends, a piston in said cylinder having operating connections to the normal steering mechanism of the vehicle, a fluid pressure pump and fluid reservoir, a control shifting lever movable in one direction operatively to condition said pump for pressure creating operation and having connections to said by-pass valve coincidently effective to close said by-pass to permit pressure fluid operation of said cylinder and movable in a reverse direction to open said by-pass and independent inoperatively to condition said pump to permit operation of the steering mechanism and manually controlled means for actuating said controlling connections to the normal operating mechanisms including means movable in reverse directions to operate said opposite pairs of intake and exhaust valves alternately to condition said steering cylinder to effect piston movement in reverse directions.

Signed at the city of Washington, in the District of Columbia, this 24th day of January, A. D. 1928.

HERMAN T. BACKHUS.